(12) United States Patent
Nakamura (10) Patent No.: US 8,169,855 B2
(45) Date of Patent: May 1, 2012

(54) ULTRASONIC SENSOR UNIT AND ELECTRONIC DEVICE

(75) Inventor: Tomoaki Nakamura, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 115 days.

(21) Appl. No.: 12/699,305

(22) Filed: Feb. 3, 2010

(65) Prior Publication Data

US 2010/0202253 A1 Aug. 12, 2010

(30) Foreign Application Priority Data

Feb. 6, 2009 (JP) ................................. 2009-026365

(51) Int. Cl.
*H04R 19/00* (2006.01)
(52) U.S. Cl. ............. 367/181; 367/140; 73/628; 73/641
(58) Field of Classification Search .................. 367/153, 367/140, 181; 73/628, 641, 622, 624, 625
See application file for complete search history.

(56) References Cited

U.S. PATENT DOCUMENTS

| | | | |
|---|---|---|---|
| 5,640,371 A * | 6/1997 | Schmidt et al. | 367/153 |
| 6,614,360 B1 * | 9/2003 | Leggett et al. | 340/853.1 |
| 7,466,064 B2 | 12/2008 | Sugiura et al. | |
| 7,613,073 B2 * | 11/2009 | Okuda et al. | 367/99 |
| 7,698,946 B2 * | 4/2010 | Clarke et al. | 73/655 |
| 7,841,982 B2 * | 11/2010 | Johnson et al. | 600/437 |
| 2009/0107243 A1 * | 4/2009 | Sugiura et al. | 73/628 |

FOREIGN PATENT DOCUMENTS

| | | |
|---|---|---|
| JP | 5-333148 A | 12/1993 |
| JP | 2003-599 A | 1/2003 |
| JP | 2005-49301 A | 2/2005 |
| JP | 2006-3278 A | 1/2006 |
| JP | 2006-229901 A | 8/2006 |

* cited by examiner

*Primary Examiner* — Ian Lobo
(74) *Attorney, Agent, or Firm* — Global IP Counselors, LLP (57) ABSTRACT

An ultrasonic sensor unit includes an ultrasonic transmission sensor array having a plurality of ultrasonic transmission sensors configured and arranged to transmit ultrasonic waves, and an ultrasonic reception sensor array having a plurality of ultrasonic reception sensors configured and arranged to receive the ultrasonic waves. The ultrasonic reception sensor array re coupled to the ultrasonic transmission sensor array so that the ultrasonic transmission sensors and the ultrasonic reception sensors do not overlap in planar view. One of the ultrasonic transmission sensor array and the ultrasonic reception sensor array include a plurality of through-holes through which one of the ultrasonic transmission sensors and the ultrasonic reception sensors provided in the other of the ultrasonic transmission sensor array and the ultrasonic reception sensor array are exposed.

6 Claims, 8 Drawing Sheets

ULTRASONIC SENSOR UNIT AND ELECTRONIC DEVICE

CROSS-REFERENCE TO RELATED APPLICATIONS

This application claims priority to Japanese Patent Application No. 2009-026365 filed on Feb. 6, 2009. The entire disclosure of Japanese Patent Application No. 2009-026365 is hereby incorporated herein by reference.

BACKGROUND

1. Technical Field

The present invention relates to an ultrasonic sensor unit.

2. Related Art

Ultrasonic sensors are used to measure distance to a target object, measure flow rates, perform nondestructive testing of ducts, and to conduct numerous other types of measurement or detection. A diaphragm-type ultrasonic sensor is known as a conventional example of such an ultrasonic sensor. In this type of ultrasonic sensor, a PZT ceramic thin film layer flanked by two electrodes is formed on one side of a diaphragm, and the electrical signals outputted from the electrodes are used to detect ultrasonic waves (see Japanese Laid-Open Patent Publication No. 2005-49301, for example).

An ultrasonic sensor array in which numerous ultrasonic sensors are arranged in an array by a MEMS technique can generate ultrasonic waves having sharp directionality in a desired direction. Techniques of three-dimensional scanning using an ultrasonic sensor array are therefore being researched.

SUMMARY

When sensors for ultrasonic transmission and sensors for ultrasonic reception are formed on the same substrate using the MEMS technique, all of the sensors have the same diaphragm structure. However, since the optimum diaphragm structures of sensors for ultrasonic transmission and sensors for ultrasonic reception are not the same, the maximum level of performance cannot be demonstrated in each type of sensor.

The present invention was developed in view of such drawbacks, and an object of the present invention is to provide an ultrasonic sensor unit whereby the maximum level of performance can be demonstrated both during transmission and reception of ultrasonic waves.

According to a first aspect of the present invention, an ultrasonic sensor unit includes an ultrasonic transmission sensor array having a plurality of ultrasonic transmission sensors configured and arranged to transmit ultrasonic waves, and an ultrasonic reception sensor array having a plurality of ultrasonic reception sensors configured and arranged to receive the ultrasonic waves. The ultrasonic reception sensor array is coupled to the ultrasonic transmission sensor array so that the ultrasonic transmission sensors and the ultrasonic reception sensors do not overlap in planar view. One of the ultrasonic transmission sensor array and the ultrasonic reception sensor array include a plurality of through-holes through which one of the ultrasonic transmission sensors and the ultrasonic reception sensors provided in the other of the ultrasonic transmission sensor array and the ultrasonic reception sensor array are exposed.

According to the ultrasonic sensor unit of the first aspect, the fact that an ultrasonic transmission sensor array and an ultrasonic reception sensors are independently provided means that it is possible to obtain a structure provided with ultrasonic transmission sensors that output a high acoustic pressure, and ultrasonic reception sensors that have excellent reception sensitivity, by forming the ultrasonic transmission sensor array and the ultrasonic reception sensors according to conditions optimal for each type of sensor. It is thereby possible to provide a highly reliable ultrasonic sensor unit that is capable of demonstrating the maximum level of performance both during transmission and reception of ultrasonic waves. Since the ultrasonic reception sensor array and the ultrasonic transmission sensor array are also bonded together, the rigidity of the sensor array is increased, and reliability during transmission and reception of ultrasonic waves can be enhanced.

In the abovementioned ultrasonic sensor unit, the ultrasonic transmission sensors may be regularly arranged in the ultrasonic transmission sensor array, and the ultrasonic reception sensors may be regularly arranged in the ultrasonic reception sensor array.

According to this configuration, the fact that the ultrasonic transmission sensors are regularly arranged means that the ultrasonic transmission sensor array can transmit ultrasonic waves at a high acoustic pressure. Since the ultrasonic reception sensors are also regularly arranged, the ultrasonic reception sensor array can receive with excellent sensitivity the ultrasonic waves transmitted from the ultrasonic transmission sensor array.

In the abovementioned ultrasonic sensor unit, an arrangement pattern of the ultrasonic transmission sensors in the ultrasonic transmission sensor array may be different from an arrangement pattern of the ultrasonic reception sensors in the ultrasonic reception sensor array. Moreover, the ultrasonic transmission sensors and the ultrasonic reception sensors may be piezoelectric sensors or capacitive sensors.

According to such a configuration, the fact that piezoelectric or capacitive sensors are used makes it possible to enhance the degree of freedom in the design of the ultrasonic transmission sensor array and the ultrasonic reception sensor array. It is thereby possible to provide an ultrasonic sensor unit that is capable of demonstrating the maximum level of performance under the desired conditions.

In the abovementioned ultrasonic sensor unit, a number of the ultrasonic transmission sensors in the ultrasonic transmission sensor array may be different from a number of the ultrasonic reception sensors in the ultrasonic reception sensor array.

According to such a configuration, the fact that each of the ultrasonic transmission sensors and the ultrasonic reception sensors are provided in an optimal number allows satisfactory characteristics to be obtained both during transmission and reception of ultrasonic waves.

BRIEF DESCRIPTION OF THE DRAWINGS

Referring now to the attached drawings which form a part of this original disclosure.

DETAILED DESCRIPTION OF EXEMPLARY EMBODIMENTS

Embodiments of the present invention will be described with reference to the drawings. The layers and members shown in the drawings are shown large enough to be recognizable, and the dimensions of each layer or member are therefore appropriately modified. The description below relates to an example in which the ultrasonic sensor unit of the present invention is provided to a PDA (personal data assistant).

First Embodiment

Figure 1:
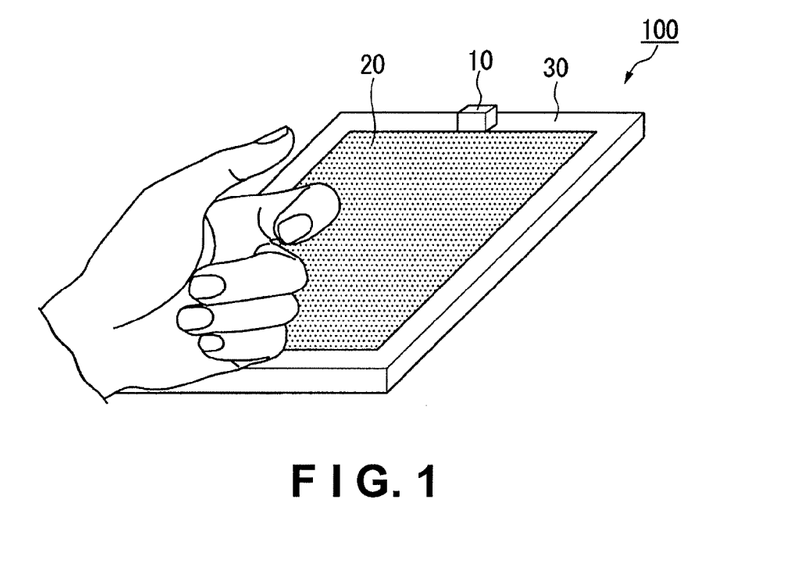
FIG. 1 is a perspective view showing a PDA.
Figure 2:
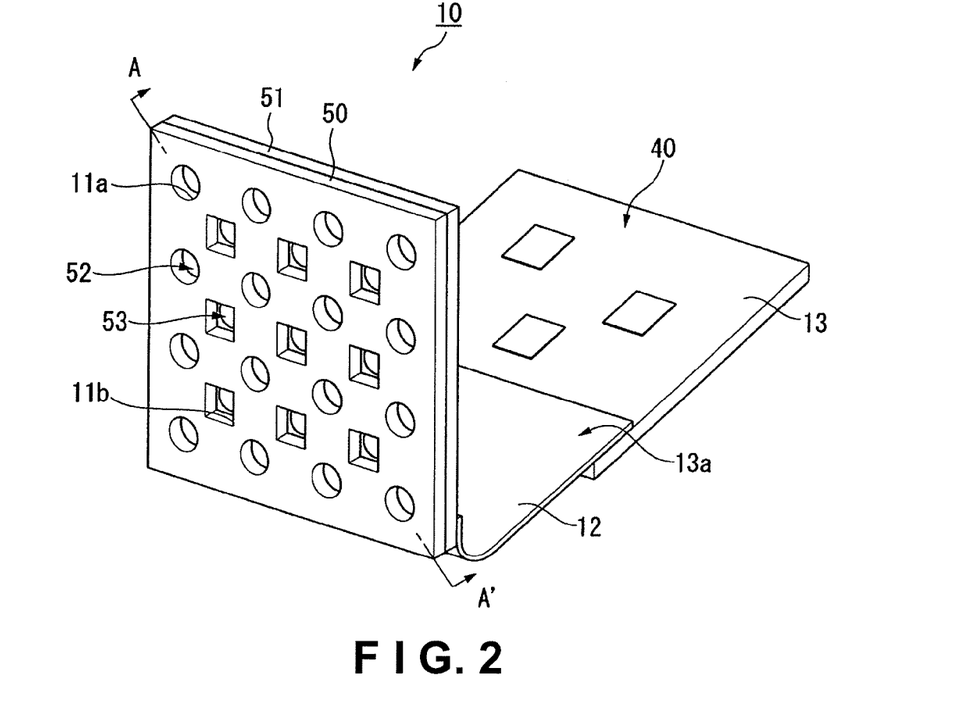
FIG. 2 is a perspective view showing the ultrasonic sensor array according to a first embodiment.
Figure 3:
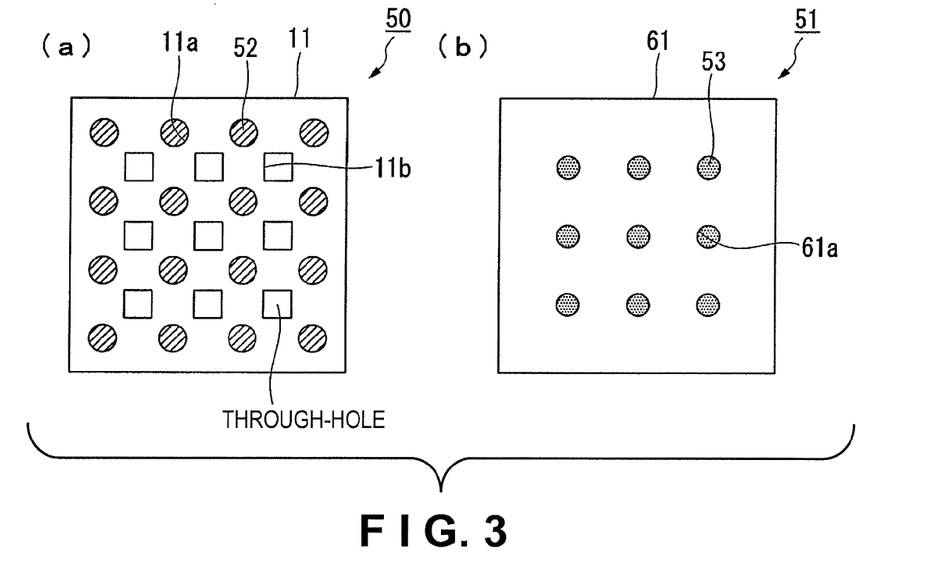
FIG. 3 includes views showing the constituent elements of the ultrasonic sensor unit.
Figure 4:
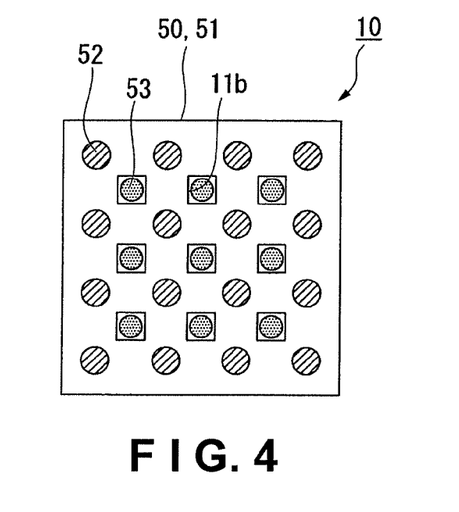
FIG. 4 is a view showing the planar structure of the ultrasonic sensor unit.
Figure 5:
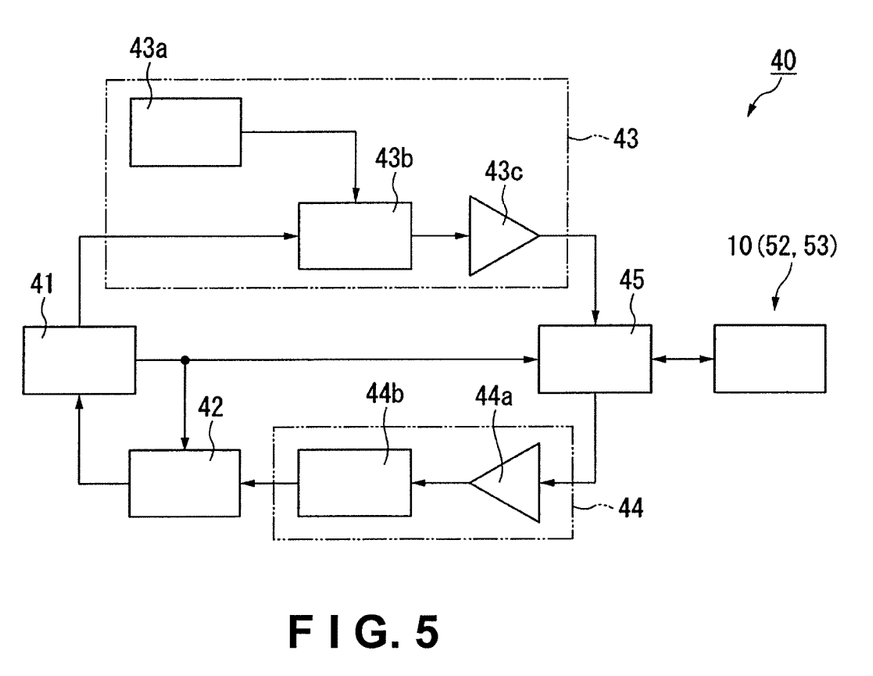
FIG. 5 is a system structure view showing the control unit of the ultrasonic sensor unit.

FIG. 1 is a schematic perspective view showing the structure of the PDA of the present embodiment. FIG. 2 is a schematic perspective view showing the structure of the ultrasonic sensor unit provided to the PDA of the present embodiment. FIG. 3(a) is a view showing the planar structure of an ultrasonic transmission sensor array as a constituent element of the ultrasonic sensor unit; and FIG. 3(b) is a view showing the planar structure of an ultrasonic reception sensor unit as a constituent element of the ultrasonic sensor unit. FIG. 4 is a view showing the planar structure of the ultrasonic sensor array. FIG. 5 is a schematic system structure view showing the structure of the control unit of the ultrasonic sensor unit of the present embodiment. In FIG. 5, the structure for applying a constant voltage to the second lower electrode described hereinafter is not shown.

In the PDA 100 of the present embodiment as shown in FIG. 1, a display unit 20 is provided to a main body 30. The display unit 20 is composed of a liquid crystal panel, organic EL panel, or the like; and is connected to a computation/control unit housed inside the main body 30. The display unit 20 is configured so as to display various operation images or other information. An ultrasonic sensor unit 10 is disposed on the periphery of the main body 30. The ultrasonic sensor unit 10 detects the shape or movement of a human hand or finger, or a pen used for input, for example, and functions as an input device for presenting input to the PDA 100. Although in this embodiment the ultrasonic sensor unit 10 is explained as being used in the PDA 100, it will be apparent to those skilled in the art from this disclosure that the ultrasonic sensor unit 10 can be applied as an input device of other electronic devices such as a hand-held gaming device, a cellular phone, a personal computer, an electronic dictionary and the like. Moreover, the ultrasonic sensor unit 10 can be used as a proximity sensor or a distance measuring sensor in a robotics device, an automobile and the like.

As shown in FIG. 2, the ultrasonic sensor unit 10 is provided with an ultrasonic transmission sensor array 50 and an ultrasonic reception sensor array 51. The ultrasonic transmission sensor array 50 has a plurality of ultrasonic transmission sensors 52 for transmitting ultrasonic waves. The ultrasonic reception sensor array 51 has a plurality of ultrasonic reception sensors 53 for receiving ultrasonic waves. Each of the ultrasonic transmission sensors 52 and ultrasonic reception sensors 53 of the present embodiment described hereinafter is composed of piezoelectric ultrasonic sensors.

As shown in FIG. 3(a), the ultrasonic transmission sensor array 50 is provided with a base 11 composed of a single-crystal silicon base plate or the like, for example. A plurality of openings 11a substantially circular in planar view is formed in an array in the base 11. An ultrasonic transmission sensor 52 for transmitting ultrasonic waves is provided in each of the openings 11a. Specifically, the ultrasonic transmission sensor array 50 is configured so that a plurality of ultrasonic transmission sensors 52 is arranged in an orderly array on one side of the base 11. In the present embodiment specifically, a plurality of ultrasonic transmission sensors 52 is arranged in a matrix.

A plurality of through-holes 11b substantially square in planar view is formed in an orderly matrix in the base 11. Specifically, the through-holes 11b are formed in the base 11 in staggered manner with respect to the openings 11a.

As shown in FIG. 3(b), the ultrasonic reception sensor array 51 is provided with a base 61 composed of a single-crystal silicon base plate or the like, for example. A plurality of openings 61a substantially circular in planar view is formed in an array in the base 61. The abovementioned ultrasonic reception sensors 53 are provided in each of the openings 61a. Specifically, the ultrasonic reception sensor array 51 is configured so that a plurality of ultrasonic reception sensors 53 is arranged in an orderly array on one side of the base 61.

In the present embodiment, the number of ultrasonic transmission sensors 52 in the ultrasonic transmission sensor array 50, and the number of ultrasonic reception sensors 53 in the ultrasonic reception sensor array 51 are different. Specifically, more ultrasonic transmission sensors 52 than ultrasonic reception sensors 53 are provided in the ultrasonic sensor unit 10. The ultrasonic sensor unit 10 is provided with the optimum number of each of the ultrasonic transmission sensors 52 and the ultrasonic reception sensors 53, and satisfactory characteristics can be obtained both during transmission and reception of ultrasonic waves.

As shown in FIG. 2, the ultrasonic sensor unit 10 is formed by bonding together the ultrasonic transmission sensor array 50 and the ultrasonic reception sensor array 51. Specifically, the ultrasonic transmission sensor array 50 and the ultrasonic reception sensor array 51 are each independently formed.

As shown in FIG. 4, the ultrasonic transmission sensor array 50 and the ultrasonic reception sensor array 51 are bonded together so that the ultrasonic transmission sensors 52 and ultrasonic reception sensors 53 do not overlap in planar view.

Specifically, the ultrasonic reception sensors 53 are exposed in the through-holes 11b formed in the base 11 of the ultrasonic transmission sensor array 50. The ultrasonic reception sensor array 51 is thus configured so that predetermined ultrasonic waves can be received by the ultrasonic reception sensor array 51 exposed in the through-holes 11b.

Moreover, the ultrasonic reception sensor array 51 and the ultrasonic transmission sensor array 50 have the same external shape, and the ultrasonic sensor unit 10 has a substantially rectangular shape in planar view.

Wires (not shown) are connected to each of the ultrasonic transmission sensors 52 and ultrasonic reception sensors 53, and the wires are connected to a terminal 13a of a control substrate 13 via a flexible printed substrate 12. A control unit 40 composed of a computation unit, a storage unit, and other components is provided to the control substrate 13. The control unit 40 is configured so as to control input signals inputted to the ultrasonic transmission sensors 52 and process output signals outputted from the ultrasonic reception sensors 53.

As shown in FIG. 5, the control unit 40 is connected to the ultrasonic sensor unit 10, and is provided primarily with a control/computation unit 41, a storage unit 42, an ultrasonic wave generation unit 43, an ultrasonic wave detection unit 44, and a T/R switch 45 for switching between transmission and reception. The ultrasonic wave generation unit 43 is composed of a sine wave generation unit 43a for generating a sine wave; a phase shifting unit 43b for varying the phase of the sine wave, the phase shifting unit 43b being provided to each ultrasonic sensor; and a driver 43c. The ultrasonic wave detection unit 44 is composed primarily of an amplifier 44a and an A/D converter 44b.

During transmission of ultrasonic waves by the ultrasonic sensor unit 10, the control/computation unit 41 causes a sine wave to be generated by the sine wave generation unit 43a and changes the sine wave to a phase that corresponds to each of the ultrasonic transmission sensors 52 through the use of the phase shifting unit 43b. During reception of ultrasonic waves in the ultrasonic sensor unit 10, the control/computation unit 41 switches the T/R switch 45 and causes the output signals outputted from the ultrasonic reception sensors 53 to be transferred to the amplifier 44a. The control/computation unit 41 is configured so as to be capable of outputting the information stored in the storage unit 42 to a control/computation unit (not shown) of the PDA 100.

Figure 6:
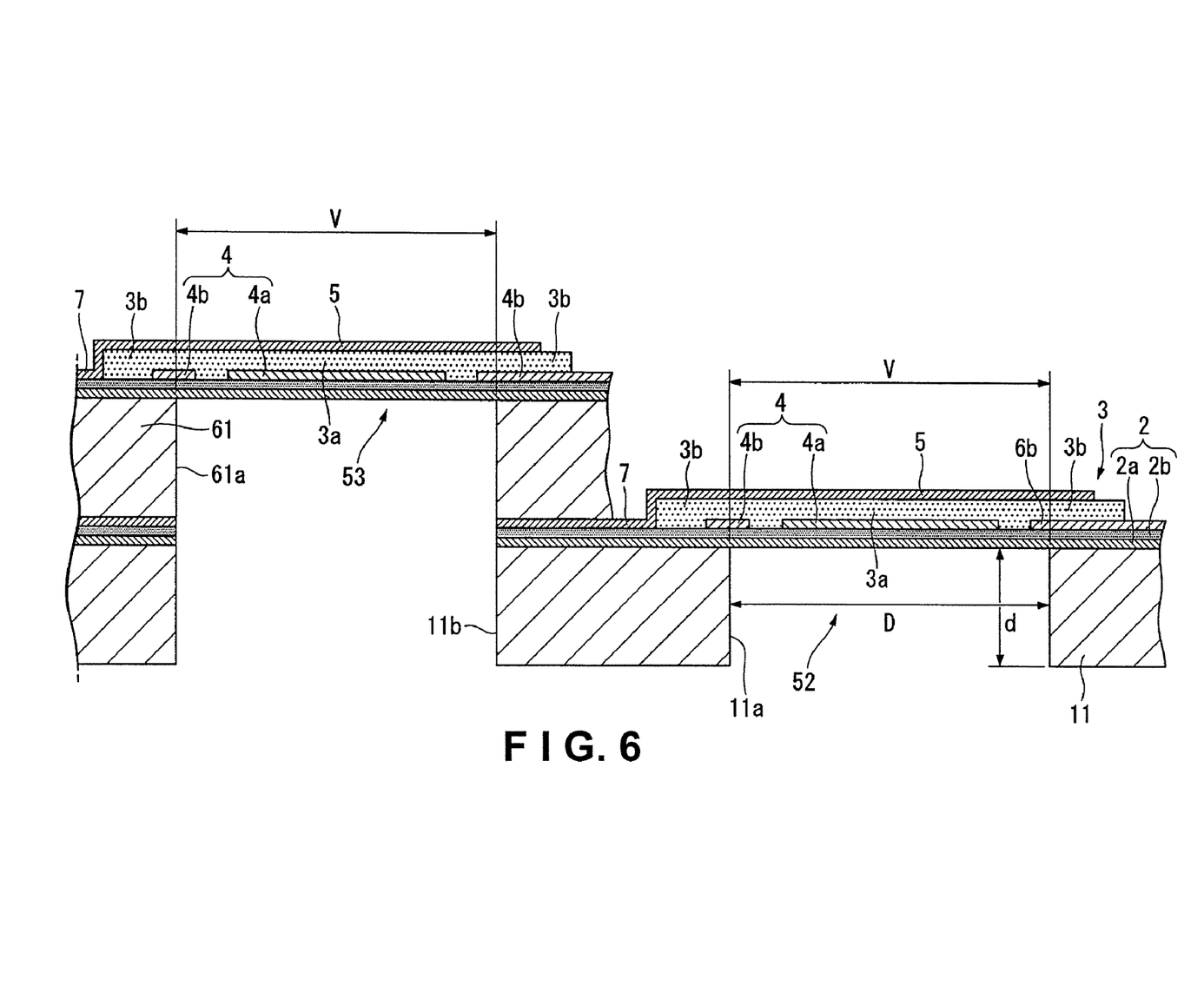
FIG. 6 is an enlarged view showing the relevant portion of the ultrasonic sensor unit.
Figure 7:
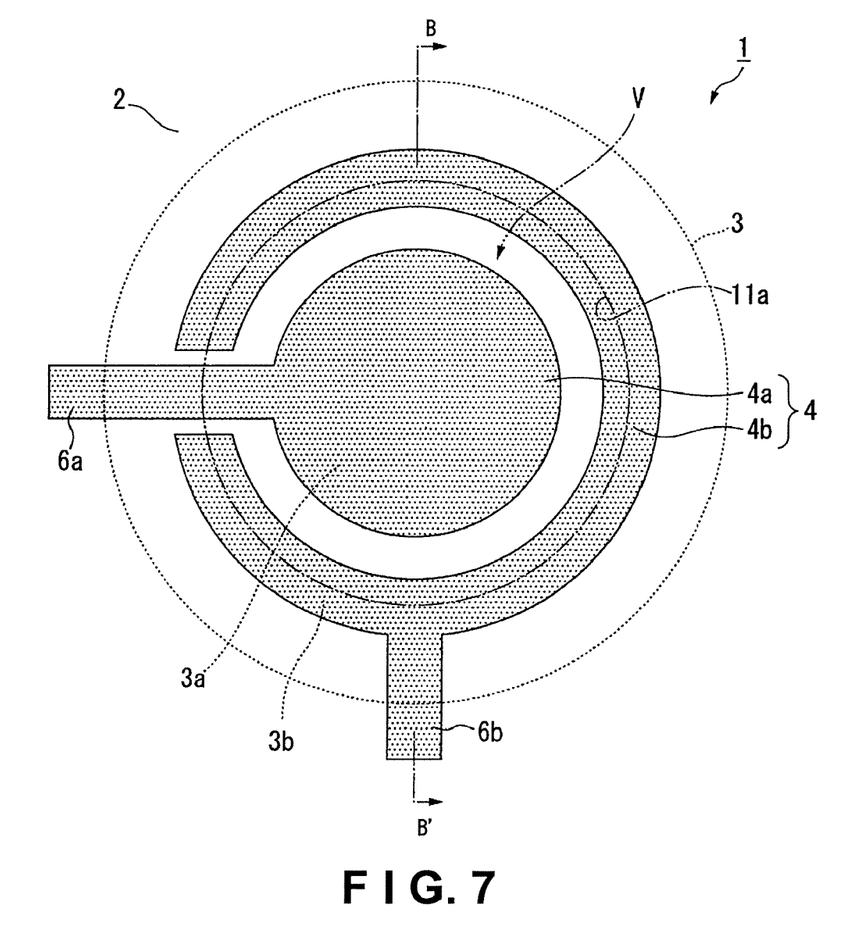
FIG. 7 is a plan view showing the lower electrode in an ultrasonic transmission sensor.

FIG. 6 is a sectional view along line A-A' of the ultrasonic sensor unit 10 shown in FIG. 2, and shows an enlarged sectional view of a single ultrasonic transmission sensor 52 and ultrasonic reception sensor 53. FIG. 7 is a plan view showing the lower electrode in an ultrasonic transmission sensor 52. The sectional view shown in FIG. 6 corresponds to the cross-section along line B-B' in FIG. 7.

As shown in FIG. 6, the ultrasonic transmission sensor 52 is provided with a diaphragm 2 provided so as to block the opening 11a of the base 11; a piezoelectric element 3 provided on the side from the diaphragm 2 opposite the base 11; and a lower electrode 4 and upper electrode 5 connected to the piezoelectric element 3. The depth d of the opening 11a formed in the base 11 is about 180 µm to 200 µm, for example.

The ultrasonic reception sensor 53 is provided with a diaphragm 2 provided so as to block the opening 61a of the base 61; a piezoelectric element 3 provided on the opposite side of the diaphragm 2 from the base 11; and a lower electrode 4 and upper electrode 5 connected to the piezoelectric element 3. The ultrasonic reception sensor 53 is in a state of being exposed within the through-hole 11b formed in the base 11 of the ultrasonic transmission sensor 52.

Since the ultrasonic transmission sensor array 50 is configured so that the ultrasonic transmission sensors 52 are regularly arranged, ultrasonic waves can be transmitted at a high acoustic pressure. Since the ultrasonic reception sensor array 51 is configured so that the ultrasonic reception sensors 53 are regularly arranged, the ultrasonic reception sensor array 51 can receive with excellent sensitivity the ultrasonic waves transmitted from the ultrasonic transmission sensor array 50.

Furthermore, in the present embodiment, the ultrasonic transmission sensor 52 and the ultrasonic reception sensor 53 are each formed independently by a MEMS technique. Since the ultrasonic transmission sensors 52 in the ultrasonic transmission sensor array 50 are therefore formed so as to satisfy optimum conditions for ultrasonic transmission, ultrasonic waves can be transmitted at a higher acoustic pressure. Since the ultrasonic reception sensors 53 in the ultrasonic reception sensor array 51 are also formed so as to satisfy optimum conditions for ultrasonic reception, significant deflection of the diaphragm is obtained even when weak ultrasonic waves attenuated by bouncing off an object are received, and more satisfactory output sensitivity is obtained.

The structure of the ultrasonic transmission sensor 52 will be described in detail. The structure of the ultrasonic reception sensor 53 is basically the same aside from the thickness and other characteristics of the diaphragm 2, piezoelectric element 3, and other components, and therefore will not be described.

The diaphragm 2 has a two-layered structure comprising a first oxide film 2a formed with $SiO_2$, for example, that is provided on the base 11 side, and a second oxide film 2b formed with $ZrO_2$, for example, that is layered on the opposite side of the first oxide film 2a from the base 11. The first oxide film 2a is formed to a thickness of about 3 µm by thermal oxidation of the surface of a single-crystal silicon substrate, for example. The second oxide film is formed to a thickness of about 400 nm, for example, by CVD (chemical vapor deposition), for example.

The region where the diaphragm 2 overlaps the opening 11a in planar fashion and is exposed to the opening 11a is the oscillation region V of the diaphragm 2. The diameter D of the opening 11a is set as needed within the range of about 100 µm to hundreds of microns, for example, according to the natural frequency of the diaphragm 2 in the oscillation region V.

The lower electrode 4 is provided in the oscillation region V on the opposite side of the diaphragm 2 from the base 11.

As shown in FIGS. 6 and 7, the lower electrode 4 is divided into a first lower electrode 4a provided in the center of the oscillation region V and a second lower electrode 4b provided on the periphery of the first lower electrode 4a. The first lower electrode 4a and second lower electrode 4b are connected to wires 6a, 6b, each of which being connected to the control unit 40 of the ultrasonic sensor unit 10. The lower electrode 4 is formed to a thickness of about 200 nm using a conductive metal material such as Ir. The piezoelectric element 3 is provided on the lower electrode 4 in the oscillation region V and outside the boundary thereof so as to cover the lower electrode 4.

The piezoelectric element 3 is formed with PZT (lead zirconate titanate) or $BaTiO_3$ (barium titanate), for example, and is composed of a first piezoelectric component 3a in the center and a second piezoelectric component 3b on the periphery of the first piezoelectric component 3a. In other words, the piezoelectric element 3 is integrally formed, and the first lower electrode 4a and second lower electrode 4b are separated from each other, so that the portion of the piezoelectric element 3 corresponding to the first lower electrode 4a is the first piezoelectric component 3a, and the portion of the piezoelectric element 3 corresponding to the second lower electrode 4b is the second piezoelectric component 3b.

The first piezoelectric component 3a is the middle portion of the piezoelectric element 3 connected to the first lower electrode 4a. The first piezoelectric component 3a is used to cause the diaphragm 2 to vibrate upon being deformed by applied voltage, or for producing a potential difference upon being deformed by the vibration of the diaphragm 2.

The second piezoelectric component 3b is the circumferential portion of the piezoelectric element 3 connected to the second lower electrode 4b. The second piezoelectric component 3b is deformed by applied voltage to statically deflect the diaphragm 2. The second piezoelectric component 3b is provided near the boundary of the oscillation region V so as to straddle the boundary of the oscillation region V.

The upper electrode 5 is formed on top of the piezoelectric element 3. The upper electrode 5 is formed with a conductive metal material such as Ir, and is connected to the first piezoelectric component 3a and second piezoelectric component 3b. The thickness of the upper electrode 5 is about 50 nm, for example. The upper electrode 5 is connected via a wire 7 to the control unit 40 of the ultrasonic sensor unit 10. Through such a configuration, the ultrasonic transmission sensor array 50 is capable of transmitting ultrasonic waves at a higher acoustic pressure.

The operation of the PDA 100 of the present embodiment will next be described.

As shown in FIG. 1, ultrasonic waves are transmitted to the detection region by the ultrasonic sensor unit 10 when the shape or movement of a human hand or finger is detected in the PDA 100.

Specifically, a constant voltage is first applied across the upper electrode 5 and second lower electrode 4b of the ultrasonic transmission sensor 52 by the control unit 40 of the ultrasonic sensor unit 10. When a voltage is applied across the upper electrode 5 and the second lower electrode 4b, the second piezoelectric component 3b formed so as to straddle the boundary of the oscillation region V of the diaphragm 2 as shown in FIG. 6 is elongated or compressed in the planar direction of the diaphragm 2 according to the applied voltage.

Figure 8:
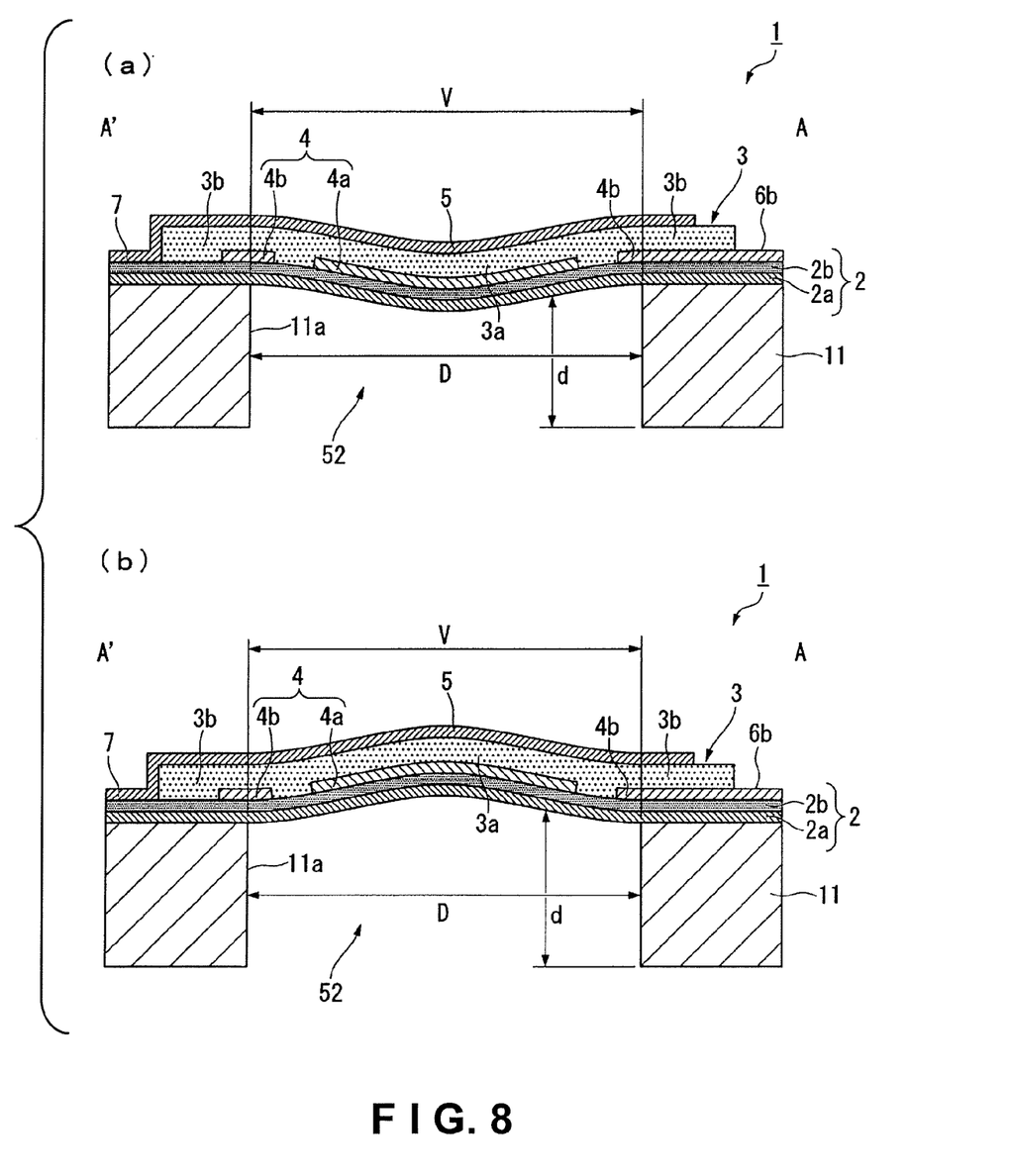
FIG. 8 includes sectional views showing the deflected states of the diaphragm of the ultrasonic sensor.

When the second piezoelectric component 3b is elongated in the planar direction of the diaphragm 2, the piezoelectric element 3 side of the diaphragm 2 is elongated in the planar direction near the border of the oscillation region V of the diaphragm 2, and the oscillation region V of the diaphragm 2 becomes convex (convex in the downward direction in the drawing) on the base 11 side as shown in FIG. 8(a). When the second piezoelectric component 3b is compressed in the planar direction of the diaphragm 2, the piezoelectric element 3 side of diaphragm 2 is compressed in the planar direction near the boundary of the oscillation region V of the diaphragm 2, and the oscillation region V of the diaphragm 2 becomes concave (convex in the upward direction in the drawing) on the base 11 side as shown in FIG. 8(b).

In this way, the voltage applied to the second piezoelectric component 3b of each individual ultrasonic transmission sensor 52 is controlled so that the amount and direction of the static deflection of the diaphragms 2 of the ultrasonic transmission sensors 52 are controlled as desired. The voltage applied to the second piezoelectric components 3b of the various ultrasonic transmission sensors 52 is also kept constant to maintain the desired shape of static deflection of the oscillation region V of the diaphragm 2.

Next, while the oscillation region V of the diaphragm 2 is statically deflected, sine waves are generated by the sine wave generation unit 43a of the control unit 40 as shown in FIG. 5, and a sine-wave voltage that is phase-shifted a small amount at a time is applied to the first lower electrode 4a of each ultrasonic transmission sensor 52 of the ultrasonic sensor unit 10 via the phase shifting unit 43b, the driver 43c, and the T/R switch 45. The first piezoelectric components 3a of the ultrasonic transmission sensors 52 thus expand and contract in the planar direction of the diaphragms 2, and the oscillation regions V of the diaphragms 2 vibrate in the normal direction of the diaphragms 2.

In the present embodiment, sine wave voltage that is phase-shifted a small amount at a time is applied to the first lower electrode 4a of each of the ultrasonic transmission sensors 52. The diaphragm 2 in the oscillation region V of each of the ultrasonic transmission sensors 52 thus vibrates while phase-shifted a small amount at a time.

The diaphragm 2 in the oscillation region V of each of the ultrasonic transmission sensors 52 vibrates while phase-shifted a small amount at a time, causing interference in the ultrasonic waves generated by the ultrasonic transmission sensors 52. Due to the interference of the ultrasonic waves generated by the ultrasonic transmission sensors 52, the direction in which the ultrasonic waves travel becomes inclined with respect to the normal direction of the diaphragm 2, and directionality is imparted to the ultrasonic waves.

This change in the ultrasonic wave directionality is utilized to change the shift in the phase of the sine wave voltage applied to the first piezoelectric components 3a of the ultrasonic transmission sensors 52, whereby the direction of the ultrasonic waves transmitted from the ultrasonic sensor unit 10 (ultrasonic transmission sensor array 50) shown in FIG. 1 is changed, and the detection region of the PDA 100 is scanned.

At this time, when a human hand or finger, for example, is present in the detection region as shown in FIG. 1, the ultrasonic waves transmitted from the ultrasonic sensor unit 10 are reflected by the human hand or finger. The ultrasonic waves reflected by the human hand or finger reach the ultrasonic reception sensors 53 via the through-holes 11b provided to the ultrasonic transmission sensor array 50, and the oscillation regions V of the diaphragms 2 of the ultrasonic reception sensors 53 thereby vibrate. When the oscillation regions V of the diaphragms 2 vibrate, the first piezoelectric components 3a expand and contract in conjunction with the expansion and contraction in the planar direction of the diaphragms 2, and a potential difference is generated in the first piezoelectric components 3a.

The potential difference generated in the first piezoelectric components 3a is transmitted in the form of output signals of the ultrasonic reception sensors 53 to the control unit 40 of the ultrasonic sensor unit 10 by the wiring 6a and 7 connected to the upper electrodes 5 and first lower electrodes 4a. The output signals from the individual ultrasonic reception sensors 53 to the control unit 40 of the ultrasonic sensor unit 10 are stored in the storage unit 42 via the T/R switch 45, amplifier 44a, and A/D converter 44b. The control/computation unit 41 calculates and outputs the distance to the human hand or finger in the detection region and the movement speed from the output signals of the ultrasonic reception sensors 53 stored in the storage unit 42.

The hand or finger state and movement are recognized by a computation control unit (not shown) of the PDA 100 on the basis of the distance to the human hand or finger and the movement speed outputted from the ultrasonic sensor unit 10, and are compared to pre-registered finger or hand states and movements. When the results of comparison show the detected human hand or finger state and movement to be consistent with those that have been pre-registered, the computation control unit of the PDA 100 recognizes the human hand or finger shape or movement as predetermined input and implements a predetermined operation such as displaying an image on the display unit 20, for example.

Consequently, through the PDA 100 of the present embodiment, the ultrasonic sensor unit 10 can function as an input device.

In the present embodiment, the piezoelectric elements 3 of the ultrasonic transmission sensors 52 and ultrasonic reception sensors 53 provided to the ultrasonic sensor unit 10 in this arrangement are composed of first piezoelectric components 3a and second piezoelectric components 3b. The amount and direction of the static deflection of the diaphragms 2 can therefore be controlled by the voltage applied to the second piezoelectric components 3b. Thus, when ultrasonic waves are transmitted upon the vibration of the diaphragms 2 by the first piezoelectric components 3a, the amount and direction of the deflection of the diaphragms 2 can be controlled by the second piezoelectric components 3b, and the ultrasonic directionality or transmission characteristics in the ultrasonic transmission sensors 52 can be controlled.

The amount and direction of deflection in the diaphragm 2 can also be controlled by the second piezoelectric component 3b to control the state of vibration produced in the diaphragm 2 by the ultrasonic waves incident on the oscillation region V of the diaphragm 2 and to adjust the input signals by changing the voltage produced upon the deformation of the first piezoelectric component 3a. It is thus possible to control the ultrasonic sensitivity and reception properties of the ultrasonic reception sensors 53.

The diaphragm 2 can also be deflected so as to result in a concave shape on the base 11 side as shown in FIG. 8(b) to thereby focus the ultrasonic waves generated by the vibration of the diaphragm 2 and to adjust the ultrasonic wave intensity or longitudinal coverage.

Moreover, in the ultrasonic transmission sensors 52 and ultrasonic reception sensors 53 of the present embodiment, the first piezoelectric component 3a and second piezoelectric component 3b are integrated with each other, and the first lower electrode 4a and second lower electrode 4b are separated from each other. It is thus possible to apply different voltages to the first piezoelectric component 3a and second piezoelectric component 3b, and to allow the first piezoelectric component 3a and second piezoelectric component 3b to be independently driven. Moreover, the potential difference generated in the first piezoelectric component 3a can be detected through the vibration of the diaphragm 2 while the diaphragm 2 is statically deflected by the second piezoelectric component 3b. The piezoelectric element 3 can also be easily manufactured, the ultrasonic transmission sensor 52 and ultrasonic reception sensor 53 productivity can be improved, and the manufacturing cost of the ultrasonic sensor unit 10 can be reduced.

The diaphragms 2 of the ultrasonic transmission sensors 52 and ultrasonic reception sensors 53 in the present embodiment are also provided so as to block the openings 11a, 61a of the bases 11, 61, and the first piezoelectric components 3a and second piezoelectric components 3b are provided in the oscillation region V of the diaphragms 2. The diaphragm 2 can thus be supported by the base 11, 61, and only the oscillation region V of the diaphragm 2 vibrates. The natural frequency of the diaphragm 2 in the oscillation region V can also be adjusted depending on the size and shape of the openings 11a, 61a. It is also possible to cause the oscillation region V of the diaphragm 2 to vibrate using the first piezoelectric component 3a or to deform the first piezoelectric component 3a via the vibration of the oscillation region V of the diaphragm 2 while the oscillation region V of the diaphragm 2 is statically deflected by the second piezoelectric component 3b.

In the ultrasonic transmission sensor 52 and ultrasonic reception sensor 53 of the present embodiment, the first piezoelectric component 3a is provided in the center of the oscillation region V, and the second piezoelectric component 3b is provided around the first piezoelectric component 3a. The peripheral portion of the oscillation region V of the diaphragm 2 can thus be deformed by the second piezoelectric component 3b, and the diaphragm 2 in the oscillation region V can be deflected in a convex or concave configuration on the base 11, 61 side. The convexly or concavely deflected diaphragm 2 can be made to vibrate by the first piezoelectric component 3a, or the first piezoelectric component 3a can be deformed by the vibration of the convexly or concavely deflected diaphragm 2.

In the ultrasonic transmission sensor 52 and ultrasonic reception sensor 53 of the present embodiment, the second piezoelectric component 3b is provided near the boundary of the oscillation region V. The diaphragm 2 can thus be deformed in the vicinity of the oscillation region V of the diaphragm 2, and the oscillation region V of the diaphragm 2 can be more efficiently deflected in a convex or concave configuration on the base 11 side.

As described above, according to the ultrasonic sensor unit 10 of the present embodiment, the fact that the ultrasonic transmission sensor array 50 and ultrasonic reception sensor array 51 configured according to optimum conditions for each are provided independently means that ultrasonic transmission sensors 52 that output high acoustic pressure and ultrasonic reception sensors 53 that have excellent reception sensitivity are provided. The ultrasonic sensor unit 10 is capable of demonstrating the maximum level of performance both during transmission and reception of ultrasonic waves, and is thus highly reliable.

Since the ultrasonic reception sensor array 51 and the ultrasonic transmission sensor array 50 of the ultrasonic sensor unit 10 are also bonded together, the rigidity of the sensor unit can be increased, and reliability during transmission and reception of ultrasonic waves can be enhanced.

Second Embodiment

The ultrasonic sensor unit according to a second embodiment of the present invention will next be described. The ultrasonic sensor unit of the present embodiment differs from the ultrasonic sensor unit of the first embodiment with regard to the arrangement structure of the ultrasonic sensors, and the other aspects of the two embodiments are the same. The same reference symbols are therefore used to refer to members that are the same as those of the first embodiment, and no detailed description of such members will be given.

Figure 9:
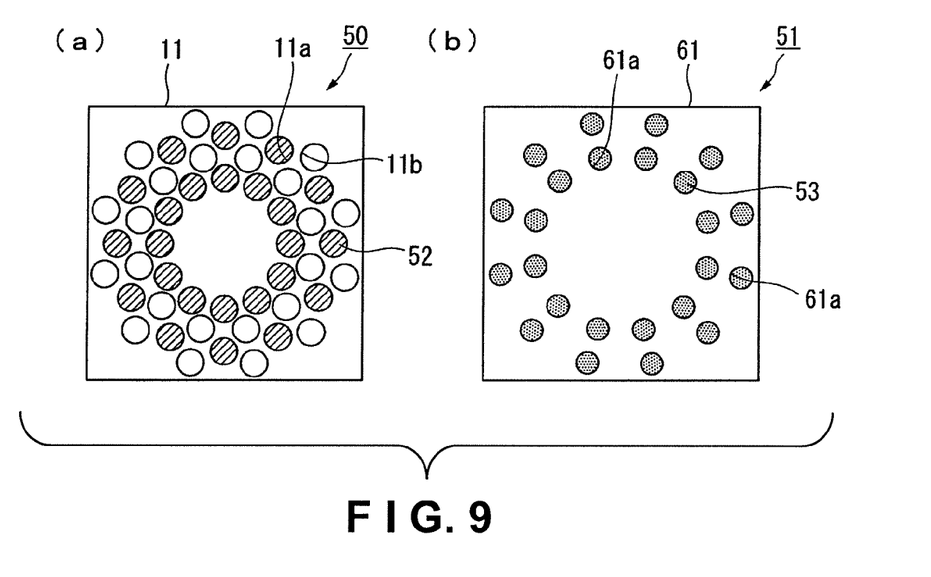
FIG. 9 is includes views showing the constituent elements of the ultrasonic sensor unit according to a second embodiment.
Figure 10:
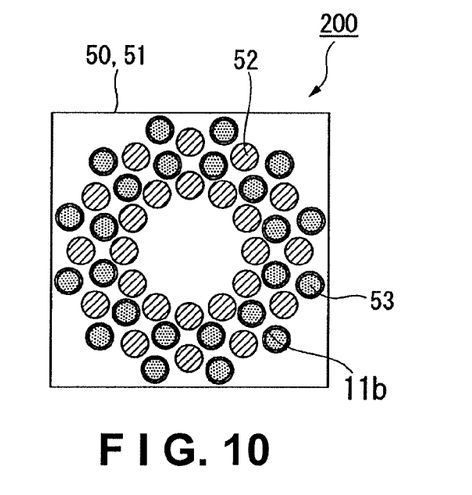
FIG. 10 is a view showing the planar structure of the ultrasonic sensor unit according to the second embodiment.

FIG. 9(a) is a view showing the planar structure of the ultrasonic transmission sensor array of the present embodiment, and FIG. 9(b) is a view showing the planar structure of the ultrasonic reception sensor array of the present embodiment. FIG. 10 is a view showing the planar structure of the ultrasonic sensor unit of the present embodiment.

As shown in FIG. 9(a), a plurality of ultrasonic transmission sensors 52 is arranged in concentric circles in the ultrasonic transmission sensor array 50 of the present embodiment. A plurality of through-holes 11b substantially circular in planar view is regularly formed concentrically in the base 11. Specifically, the through-holes 11b are formed in the base 11 so as to be concentric with the opening 11a.

As shown in FIG. 9(b), a plurality of ultrasonic reception sensors 53 is arranged in concentric circles in the ultrasonic reception sensor array 51 of the present embodiment.

As shown in FIG. 10, the ultrasonic sensor unit 200 is formed by bonding together the ultrasonic transmission sensor array 50 and the ultrasonic reception sensor array 51. The ultrasonic transmission sensor array 50 and the ultrasonic reception sensor array 51 are bonded together so that the ultrasonic transmission sensors 52 and ultrasonic reception sensors 53 do not overlap each other in planar view. The ultrasonic reception sensors 53 are exposed within the through-holes 11b formed in the base 11 of the ultrasonic transmission sensor array 50. Predetermined ultrasonic waves can thereby be received by the ultrasonic reception sensor array 51 exposed in the through-holes 11b in the ultrasonic reception sensor array 51.

Since the ultrasonic transmission sensor array 50 and ultrasonic reception sensor array 51 are provided independently in the ultrasonic sensor unit 200 of the present embodiment as well, ultrasonic transmission sensors 52 that output high acoustic pressure and ultrasonic reception sensors 53 that have excellent reception sensitivity are provided. The maximum level of performance can thus be demonstrated both during transmission and reception of ultrasonic waves, and excellent reliability is obtained.

The present invention is not limited to the embodiments above, and various modifications can be made without departing from the scope of the invention. For example, the planar shape of the openings 11a, 61a formed in the bases 11, 61 is not limited to being circular, and the planar shape of the through-holes 11b formed in the base 11 is not limited to being rectangular.

In the embodiments described above, cases are described in which through-holes 11b are formed in the base 11 of the ultrasonic transmission sensor array 50, but a configuration may be adopted in which through-holes 61b are formed in the base 61 of the ultrasonic reception sensor array 51. Specifically, the sequence in which the ultrasonic transmission sensor array 50 and ultrasonic reception sensor array 51 are bonded together may be reversed.

Cases are also described in the embodiments in which each of the ultrasonic transmission sensors 52 and the ultrasonic reception sensors 53 are composed of piezoelectric elements, but the present invention is not limited by this configuration. At least one of the ultrasonic transmission sensors 52 and ultrasonic reception sensors 53 (for example, the ultrasonic transmission sensors 52) may be composed of electrostatic capacitive ultrasonic sensors.

Figure 11:
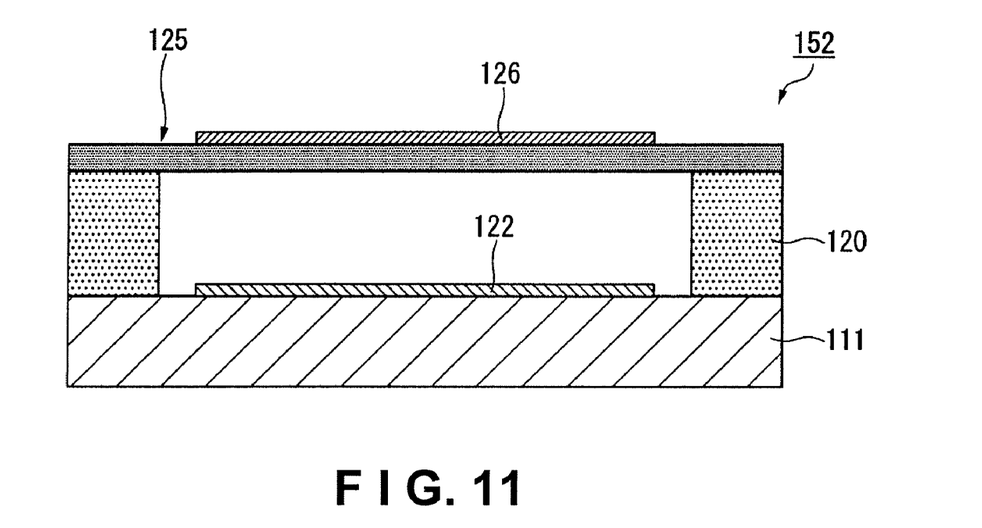
FIG. 11 is a view showing the basic structure of an electrostatic capacitive ultrasonic transmission sensor.

FIG. 11 is a view showing the basic structure of an ultrasonic transmission sensor 152 composed of an electrostatic capacitive ultrasonic sensor. As shown in FIG. 11, the ultrasonic transmission sensor 152 is provided with a membrane 125; an upper electrode 126 provided on the membrane 125; and a lower electrode 122 provided facing the upper electrode 121 to the surface of a base 111 composed of a single-crystal silicon substrate or the like between membrane supports 120.

In the ultrasonic transmission sensor 152, a voltage is applied across the upper electrode 126 and the lower electrode 122, whereby the electrodes are pulled together, and the electrodes return to the original state when the voltage is zero. Ultrasonic waves are generated by the oscillation of the membrane due to this oscillating action, and radiate in the direction above the upper electrode 126.

The present invention can thus be applied in a case in which the ultrasonic transmission sensors 52 are composed of electrostatic capacitive ultrasonic sensors. It is therefore possible to enhance the degree of freedom in the design of the ultrasonic transmission sensors 52 and the ultrasonic reception sensors 53, and it is possible to provide an ultrasonic sensor unit that is capable of demonstrating the maximum level of performance both during transmission and reception of ultrasonic waves.

In the first embodiment described above, a case is described in which the ultrasonic transmission sensors 52 and ultrasonic reception sensors 53 are each arranged in a matrix in planar view, and in the second embodiment, a case is described in which the ultrasonic transmission sensors 52 and ultrasonic reception sensors 53 are each arranged in concentric circles in planar view. However, the present invention is not limited by these examples. For example, a configuration may be adopted in which any one of the ultrasonic transmission sensors 52 and ultrasonic reception sensors 53 is arranged in a matrix, or any one of the ultrasonic transmission sensors 52 and ultrasonic reception sensors 53 is arranged in concentric circles.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. An ultrasonic sensor unit comprising:
   a transmission base plate including an ultrasonic transmission sensor array having a plurality of ultrasonic transmission sensors configured and arranged to transmit ultrasonic waves; and
   a reception base plate including an ultrasonic reception sensor array having a plurality of ultrasonic reception sensors configured and arranged to receive the ultrasonic waves, the reception base plate and the transmission base plate being layered together so that the ultrasonic transmission sensors and the ultrasonic reception sensors do not overlap as viewed in a planar direction and as viewed in a normal direction of the transmission base plate and the reception base plate,
   one of the transmission base plate and the reception base plate defining a plurality of through-holes at positions corresponding to one of the ultrasonic transmission sensors and the ultrasonic reception sensors provided in the other of the transmission base plate and the reception base plate so that the one of the ultrasonic transmission sensors and the ultrasonic reception sensors are exposed through the through-holes.

2. The ultrasonic sensor unit according to claim 1, wherein
the ultrasonic transmission sensors are regularly arranged in the ultrasonic transmission sensor array on the transmission base plate, and
the ultrasonic reception sensors are regularly arranged in the ultrasonic reception sensor array on the reception base plate.

3. The ultrasonic sensor unit according to claim 2, wherein
an arrangement pattern of the ultrasonic transmission sensors in the ultrasonic transmission sensor array on the transmission base plate is different from an arrangement pattern of the ultrasonic reception sensors in the ultrasonic reception sensor array on the reception base plate.

4. The ultrasonic sensor unit according to claim 1, wherein the ultrasonic transmission sensors and the ultrasonic reception sensors are piezoelectric sensors or capacitive sensors.

5. The ultrasonic sensor unit according to claim 1, wherein a number of the ultrasonic transmission sensors in the ultrasonic transmission sensor array on the transmission base plate is different from a number of the ultrasonic reception sensors in the ultrasonic reception sensor array on the reception base plate.

6. An electronic device having the ultrasonic sensor unit according to claim 1.

* * * * *